US011428779B2

(12) United States Patent
Schmid et al.

(10) Patent No.: US 11,428,779 B2
(45) Date of Patent: Aug. 30, 2022

(54) SEMICONDUCTOR CHIP AND DEVICE AND METHOD FOR DRIVING AT LEAST ONE CHANNEL FOR A RADAR SIGNAL

(71) Applicant: Infineon Technologies AG, Neubiberg (DE)

(72) Inventors: Christian Schmid, Linz (AT); Rainer Findenig, Linz (AT); Bernhard Greslehner-Nimmervoll, Hagenberg (AT)

(73) Assignee: Infineon Technologies AG, Neubiberg (DE)

( * ) Notice: Subject to any disclaimer, the term of this patent is extended or adjusted under 35 U.S.C. 154(b) by 380 days.

(21) Appl. No.: 16/262,987

(22) Filed: Jan. 31, 2019

(65) Prior Publication Data
US 2019/0250247 A1    Aug. 15, 2019

(30) Foreign Application Priority Data

Feb. 12, 2018   (DE) .......................... 102018103088.6

(51) Int. Cl.
*G01S 7/40* (2006.01)
*G01S 7/03* (2006.01)
*G01S 13/87* (2006.01)
*G01S 7/35* (2006.01)

(52) U.S. Cl.
CPC .............. *G01S 7/4004* (2013.01); *G01S 7/03* (2013.01); *G01S 7/35* (2013.01); *G01S 13/87* (2013.01); *G01S 7/4056* (2013.01)

(58) Field of Classification Search
CPC .......... G01S 7/4004; G01S 7/03; G01S 13/87; G01S 7/35; G01S 7/4056; G01S 13/343; G01S 13/825; G01S 13/003; G01S 13/931; G01S 7/032; G01S 7/352; G01S 7/40; G01S 7/0232; G01S 7/0235; G06F 1/04; G06F 1/08; G06F 1/12; G06F 12/0842

See application file for complete search history.

(56) References Cited

U.S. PATENT DOCUMENTS

| 4,540,985 | A * | 9/1985 | Clancy ................... G01S 7/2923 342/90 |
| 10,530,611 | B1 * | 1/2020 | Manglani ............ G06F 13/4291 |
| 2007/0178946 | A1 * | 8/2007 | Pal ........................ H04B 1/0003 455/574 |
| 2015/0002328 | A1 | 1/2015 | Vaucher et al. |
| 2015/0074293 | A1 * | 3/2015 | Nagata .................. G06F 3/0613 710/5 |
| 2015/0153445 | A1 | 6/2015 | Jansen |
| 2016/0018511 | A1 | 1/2016 | Nayyar et al. |
| 2017/0090015 | A1 | 3/2017 | Breen |
| 2017/0139036 | A1 * | 5/2017 | Nayyar ................. G01S 13/282 |
| 2018/0024233 | A1 * | 1/2018 | Searcy .................... G01S 7/032 342/125 |
| 2018/0115409 | A1 * | 4/2018 | Nayyar ................. G01S 13/343 |

* cited by examiner

*Primary Examiner* — Olumide Ajibade Akonai
(74) *Attorney, Agent, or Firm* — Harrity & Harrity, LLP

(57) ABSTRACT

A semiconductor chip comprising at least one transmit channel and/or at least one receive channel for radar signals and also a sequencing circuit is proposed. In this case, the sequencing circuit is configured centrally to determine a sequencing scheme for time-dependent functions of the transmit channel and/or of the receive channel and to drive circuit elements of the transmit channel and/or of the receive channel in accordance with the sequencing scheme.

20 Claims, 11 Drawing Sheets

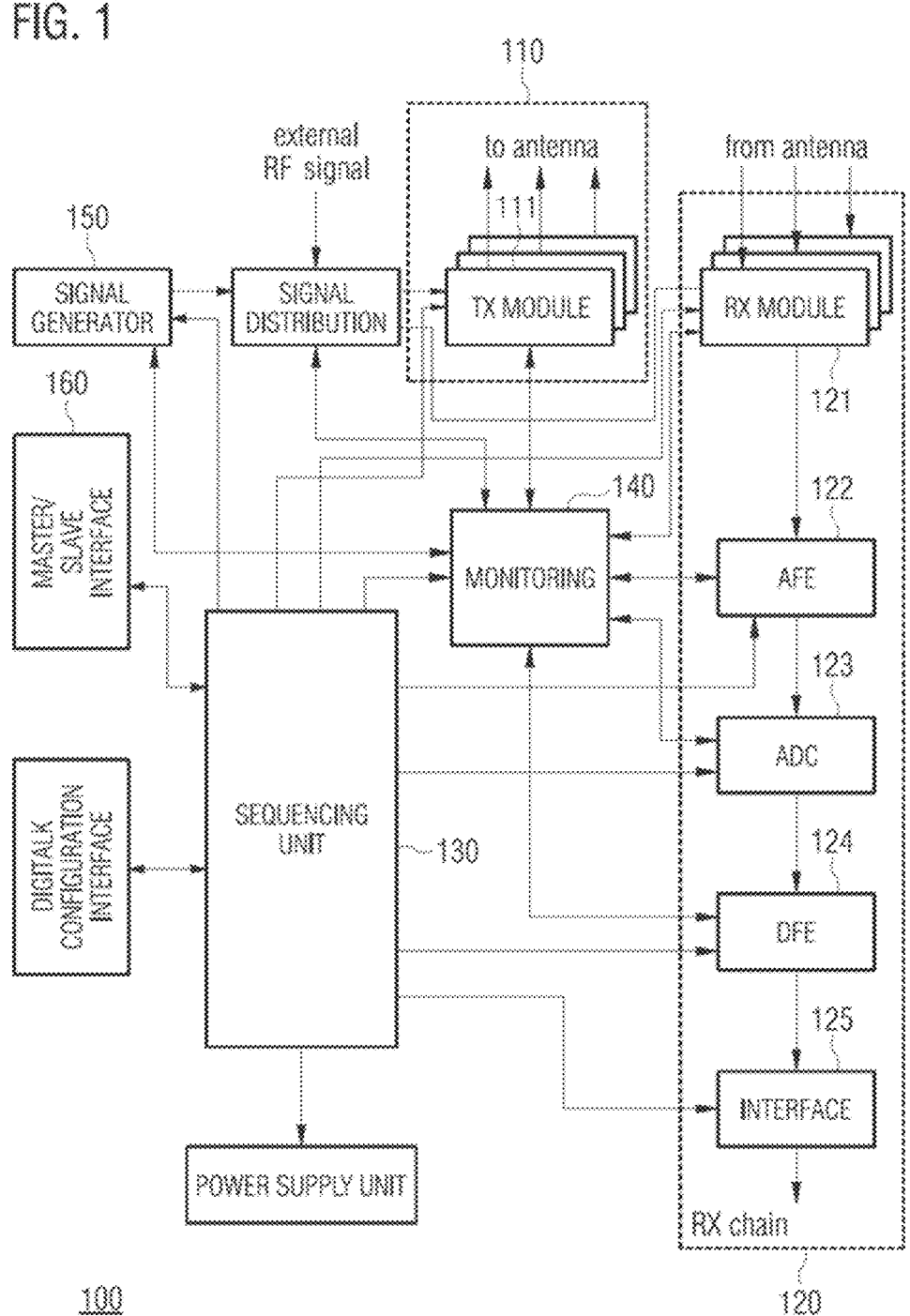

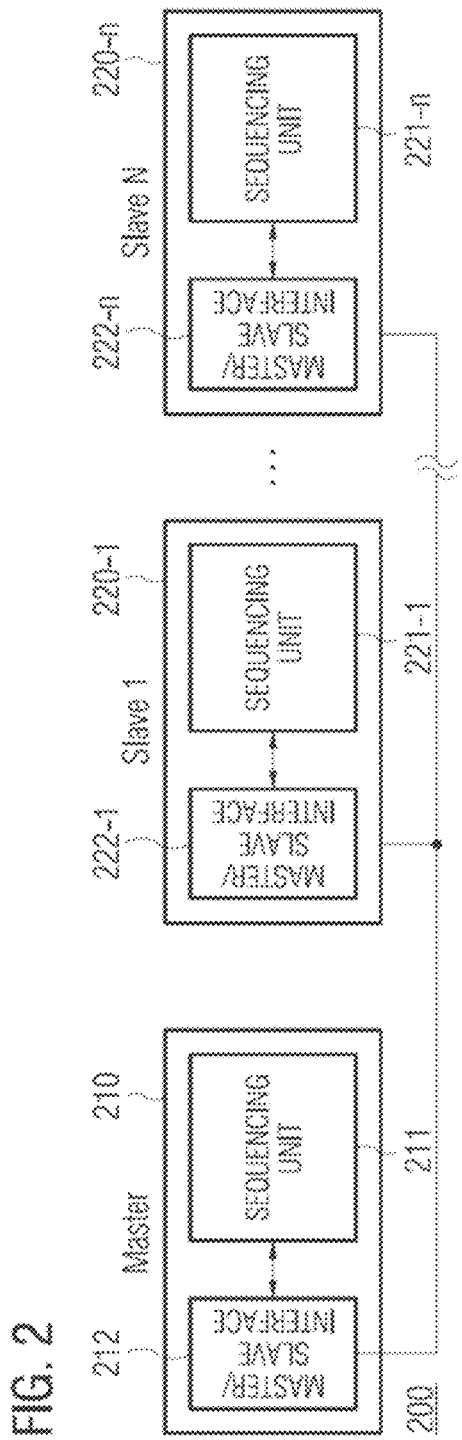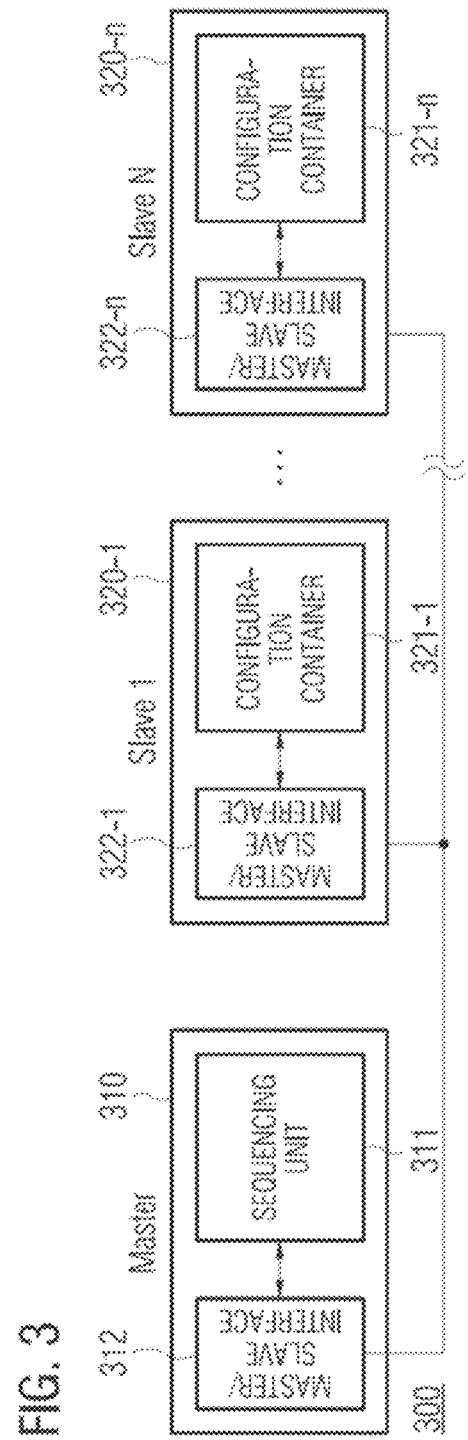

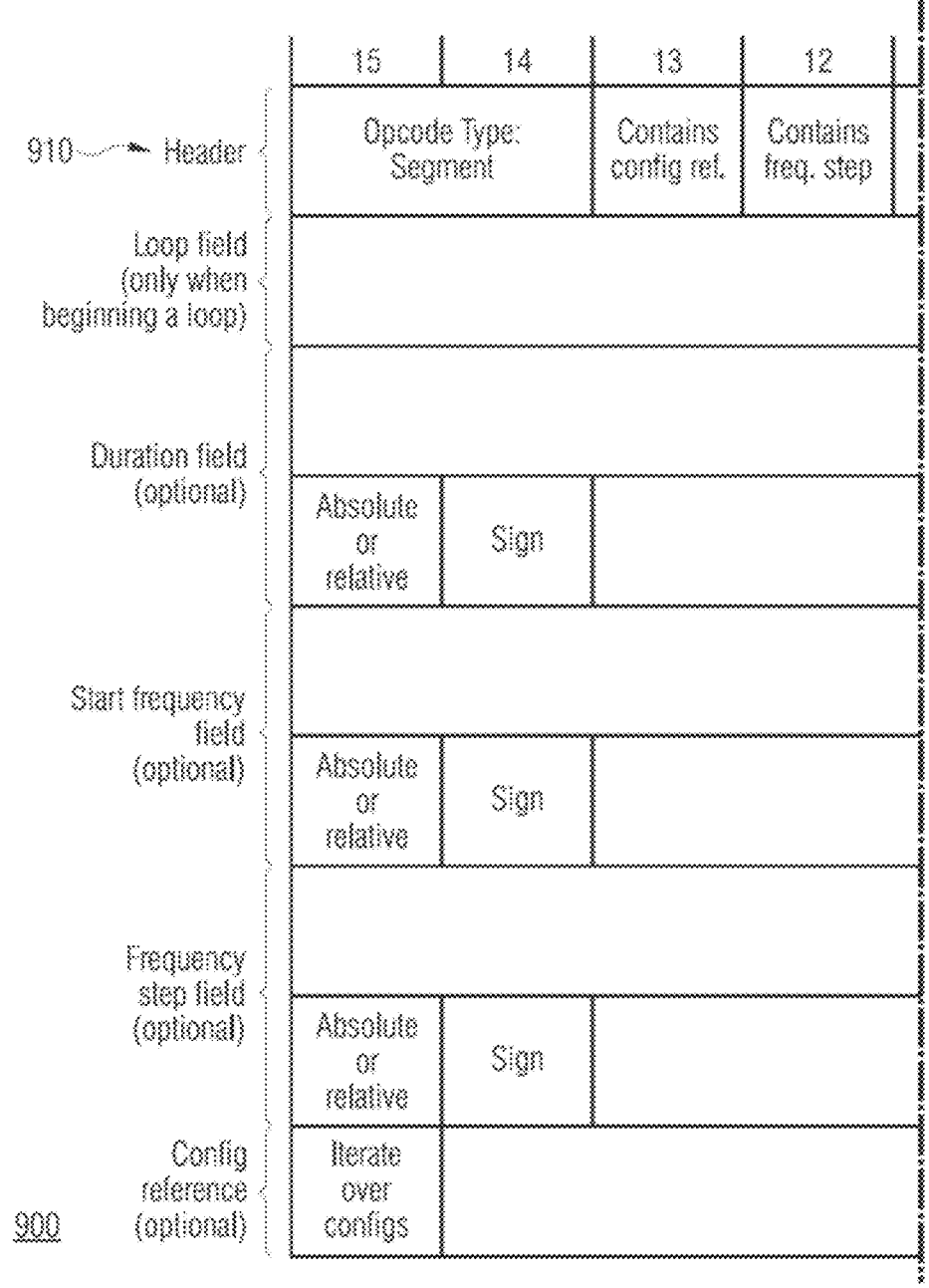

SEMICONDUCTOR CHIP AND DEVICE AND METHOD FOR DRIVING AT LEAST ONE CHANNEL FOR A RADAR SIGNAL

RELATED APPLICATION

This application claims priority under 35 U.S.C. § 119 to German Patent Application No. 102018103088.6, filed on Feb. 12, 2018, the contents of which are incorporated by reference herein in their entirety.

TECHNICAL FIELD

Example implementations are concerned with the control of radar systems. Example implementations are in particular concerned with a semiconductor chip and a device and a method for driving at least one channel for a radar signal.

BACKGROUND

The integration level and complexity of radar sensors (e.g. in the automotive field) are increasing ever further. A multiplicity of functions within the radar sensor must be synchronized or operated in a synchronized manner.

Frequency-modulated continuous wave radar (FMCW) systems are based on the transmission of frequency sweeps, also called ramps, which are defined by their start frequency, their stop frequency and their duration. Besides frequency generation itself, it is usually necessary to control further functions such as e.g. transmit channels, analog-to-digital converters (ADCs), monitoring functions or power amplifiers (PAs) synchronously with the frequency ramp.

Complexity as well as power and/or resource consumption of the function synchronization should be as low as possible in this case.

SUMMARY

There is thus a need to provide an improved technology for synchronizing functions in radar sensors or radar systems.

The need can be met by the subject matter of the patent claims.

A first example implementation relates to a semiconductor chip comprising at least one transmit channel and/or at least one receive channel for radar signals and also a sequencing circuit. In this case, the sequencing circuit is configured centrally to determine a sequencing scheme for time-dependent functions of the transmit channel and/or of the receive channel and to drive circuit elements of the transmit channel and/or of the receive channel in accordance with the sequencing scheme.

A second example implementation relates to a system comprising a first semiconductor chip in accordance with one of the example implementations and a second semiconductor chip. In this case, the sequencing circuit of the first semiconductor chip is configured to generate a control signal for a sequencing circuit of the second semiconductor chip. The control signal comprises at least one instruction for the sequencing circuit of the second semiconductor chip relative to a second sequencing scheme for time-dependent functions of at least one transmit channel and/or at least one receive channel for radar signals of the second semiconductor chip.

A third example implementation relates to a system comprising a first semiconductor chip in accordance with one of the example implementations and a second semiconductor chip. The sequencing circuit of the first semiconductor chip is configured to generate a trigger signal for a sequencing circuit of the second semiconductor chip. The trigger signal causes the sequencing circuit of the second semiconductor chip to determine a sequencing scheme for time-dependent functions of at least one transmit channel and/or at least one receive channel of the second semiconductor chip and to drive circuit elements of the transmit channel and/or of the receive channel of the second semiconductor chip in accordance with the sequencing scheme.

A fourth example implementation relates to a system comprising a first semiconductor chip in accordance with one of the example implementations and a second semiconductor chip having a memory and also at least one further transmit channel and/or at least one further receive channel for radar signals. A further sequencing scheme for time-dependent functions of the further transmit channel and/or of the further receive channel is stored in the memory. The control circuit of the first semiconductor chip is configured to generate a trigger signal that causes circuit elements of the further transmit channel and/or of the further receive channel to perform the time-dependent functions in accordance with the further sequencing scheme.

A fifth example implementation relates to a device for driving at least one transmit channel for a radar signal. The device comprises a plurality of registers, wherein configuration parameters for circuit components of the transmit channel and frequency parameters for a respective assigned signal section of the radar signal are stored in the plurality of registers. Furthermore, the device comprises a control circuit configured to read the plurality of registers sequentially and to drive the circuit components of the transmit channel in each case on the basis of the information items stored in the plurality of registers.

A sixth example implementation relates to a method for driving at least one transmit channel for a radar signal. The method comprises sequentially reading a plurality of registers, wherein configuration parameters for circuit components of the transmit channel and frequency parameters for a respective assigned signal section of the radar signal are stored in the plurality of registers. Furthermore, the method comprises driving the circuit components of the transmit channel in each case on the basis of the information items stored in the plurality of registers.

Further example implementations additionally relate to a program comprising a program code for carrying out the method described herein if the program is executed on a processor or a programmable hardware component.

Moreover, example implementations relate to a nonvolatile machine-readable medium on which is stored a program comprising a program code for carrying out the method described herein if the program is executed on a processor or a programmable hardware component.

Furthermore, one example implementation relates to yet another device for driving at least one transmit channel for a radar signal. The device comprises means for sequentially reading a plurality of registers, wherein configuration parameters for circuit components of the transmit channel and frequency parameters for a respective assigned signal section of the radar signal are stored in the plurality of registers. Furthermore, the device comprises means for driving the circuit components of the transmit channel in each case on the basis of the information items stored in the plurality of registers.

BRIEF DESCRIPTION OF THE FIGURES

Some examples of devices and/or methods are explained in greater detail merely by way of example below with reference to the accompanying figures, in which:

FIG. 1 shows one example implementation of a semiconductor chip;

DESCRIPTION

Figure 4:
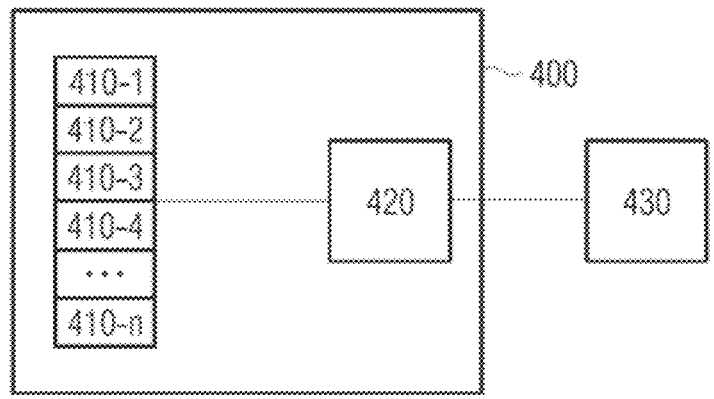
FIG. 4 shows one example implementation of a device for driving at least one transmit channel for a radar signal.

Various examples will now be described thoroughly with reference to the accompanying figures, in which some examples are illustrated. In the figures, the thicknesses of lines, layers and/or regions may be illustrated in enlarged fashion for elucidation purposes.

While further examples are suitable for various modifications and alternative forms, some specific examples thereof are accordingly shown in the figures and described thoroughly below. However, this detailed description does not limit further examples to the specific forms described. Further examples can cover all modifications, counterparts and alternatives that fall within the scope of the disclosure. Throughout the description of the figures, identical reference signs refer to identical or similar elements which can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e. only A, only B, and A and B. An alternative wording for the same combinations is "at least one from A and B". The same applies to combinations of more than two elements.

The terminology used here for describing specific examples is not intended to be limiting for further examples. If a singular form, e.g. "a, an" and "the", is used and the use of only a single element is defined neither explicitly nor implicitly as obligatory, further examples can also use plural elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage indicate with greater precision the presence of the specified features, integers, steps, operations, processes, elements, components and/or a group thereof, but do not exclude the presence or the addition of one or more other features, integers, steps, operations, processes, elements, components and/or a group thereof.

Unless defined otherwise, all terms (including technical and scientific terms) are used here in their customary meaning in the field with which examples are associated.

FIG. 1 shows a semiconductor chip 100 comprising at least one transmit channel 110 for radar signals and/or at least one receive channel 120 for radar signals. The semiconductor chip 100 can thus be regarded as part of a radar sensor or part of a radar system. The transmit channel 110 comprises one or more circuit components and is configured to generate one or more radar transmission signals and to output the latter to one or more antennas. As indicated in FIG. 1, the transmit channel 110 can comprise e.g. one or more transmitters 111. The receive channel 120 comprises one or more circuit components and is configured to receive and process one or more radar reception signals from one or more antennas. As indicated in FIG. 1, the receive channel 120 can comprise e.g. one or more receivers 121, an analog front-end 122, an ADC 123, a digital front-end 124 and an interface 125.

Furthermore, semiconductor chip 100 comprises a sequencing circuit 130 configured centrally to determine a sequencing scheme for (e.g. all) time-dependent functions of the transmit channel 110 and/or of the receive channel 120 and also to drive circuit elements of the transmit channel 110 and/or of the receive channel 120 in accordance with the sequencing scheme. A time-dependent function of the transmit channel 110 and/or of the receive channel 120 is a function which is to be performed or carried out in a manner temporally coordinated or synchronized with other time-dependent functions of the transmit channel 110 and/or of the receive channel 120 in order to ensure correct operation of the radar sensor or radar system. Accordingly, the sequencing scheme represents the temporally coordinated or synchronized order of performance of the individual time-dependent functions.

By way of example, the time-dependent functions can comprise a function of the transmit channel 110 relating to generating a radio-frequency radar transmission signal, a function of the receive channel 120 relating to processing a radio-frequency radar reception signal, a monitoring function for one or more circuit components of the transmit channel 110 and/or of the receive channel 120 and/or a monitoring function for a signal processed by the transmit channel 110 and/or the receive channel 120.

The sequencing circuit 130 can be implemented for example as a dedicated circuit or a circuit for executing software in conjunction with associated implemented software configured to determine a sequencing scheme and to drive circuit elements of the transmit channel 110 and/or of the receive channel 120 in accordance with the sequencing scheme.

Radar operation of the at least one transmit channel 110 situated on the semiconductor chip 100 and/or of the at least one receive channel 120 situated on the semiconductor chip 100 is controlled centrally by the sequencing circuit 130 arranged on the semiconductor chip 100. Accordingly, the radar operation on the semiconductor chip 100 can be effected substantially autonomously, i.e. independently of external controllers, on account of the sequencing circuit 130.

The semiconductor chip 100 can be used for example for a (phase- or frequency-) modulated continuous wave radar system. Accordingly, the transmit channel 110 and/or the receive channel 120 can be part of a modulated continuous wave radar system, for example of an FMCW radar in the automotive field. The sequencing circuit 130 can accordingly be understood as a central sequencing unit which can coordinate all time-critical functions of the automotive FMCW radar front-end, such that a radar operation is an autonomous process which for example does not necessitate the participation of an external processor. In comparison with systems in which the synchronization of functions is distributed via a plurality of chips (e.g. a central microcontroller chip for controlling and/or for reconfiguring monitoring functions and also a phase-locked loop chip for providing a desired frequency profile), the development outlay can be lower. On account of the autonomous radar operation of the semiconductor chip 100, a load for a main processor of a radar sensor or of a radar system can be reduced and a higher flexibility can be achieved. Furthermore, a very high synchronism (e.g. greater than in customary processors) can be made possible on account of the possibility for the specific design of the sequencing unit.

In addition to e.g. controlling a desired frequency profile of a radar transmission signal, the sequencing circuit 130 shown in FIG. 1 can control various other aspects of a radar sensor or radar system in a synchronized manner. By way of example, in the transmitter 111, a PA can be switched on and off in a synchronized manner or a phase shift of radar transmission signals can be carried out in a synchronized manner. The monitoring of the transmit channel 110 and/or of the receive channel 120 can be carried out e.g. by means of a monitoring circuit 140. The latter can accordingly be driven by the sequencing circuit 130 to trigger or to activate or to deactivate a monitoring function in a synchronized manner in accordance with the sequencing scheme. By way of example, monitoring functions can be activated or deactivated in a synchronized manner during ramp formation, a calibration (e.g. amplification of a voltage-controlled oscillator), a cascaded operation or a configuration of external components or slaves (e.g. Serial Peripheral Interface (SPI) or DeMUltipleXing (DMUX)).

In the signal generating circuit 150, in a synchronized manner, for example, the bandwidth of a phase-locked loop (PLL) can be set (e.g. charge pump current) or more extensive modulation concepts can be activated or deactivated (e.g. 2-point modulation, resetting current). Likewise, in a synchronized manner, for example, loop filter reset circuits can be activated or deactivated or monitoring functions can be activated or deactivated. Moreover, in a synchronized manner, by way of example, voltages can be roughly set, calibration parameters (e.g. offset current, antibacklash, amplification of a voltage-controlled oscillator) can be set or a signal source (e.g. when using a plurality of PLLs) can be selected.

In the receiver 121, in a synchronized manner, by way of example, digital or analog filters can be set (resetting, configuration, bypass . . . ) or decimation rates can be set. LVDS (Low Voltage Differential Signaling) modes or calibrations can be chosen in a synchronized manner. Likewise, in a synchronized manner, the receive channel 120 can e.g. also be activated or deactivated in its entirety or a reception frame delay can be set. By way of example, the ADC 123 can also be configured, calibrated, activated or deactivated in a synchronized manner.

Likewise, general purpose inputs/outputs (GPIOs) can be configured in a synchronized manner, circuit components for generating frequency ramps can be triggered or diverse circuit components (e.g. ADC 123) can be switched on or off. Moreover, interrupts can be generated or other chip functionality can be triggered.

In order to synchronize the time-dependent functions presented by way of example above, the sequencing circuit 130 can comprise an instruction-processing unit (not shown) with a specific instruction set for determining the sequencing scheme. The instruction set can describe the configuration flow over time and be for example similar to the instruction set of a general purpose processor. By way of example, the instruction set can comprise first specific instructions for the configuration of the circuit elements of the transmit channel 110 and/or of the receive channel 120 and also second specific instructions for the configuration of frequency parameters of a radio-frequency radar transmission signal generated by the transmit channel 110. Details of the specific instruction set are explained more specifically below with reference to FIGS. 4 to 10.

Sequencing circuit 130 can thus be understood as a radar-specific sequencing unit having an instruction set associated with a specific purpose in order to handle time-critical configurations in a highly integrated radar chip.

The master/slave interface 160 shown in FIG. 1 can additionally be used to control or supervise further radar chips in a cascading of a plurality of chips. Some possible implementations are described below with reference to FIGS. 2 and 3.

Figures 2, 9:
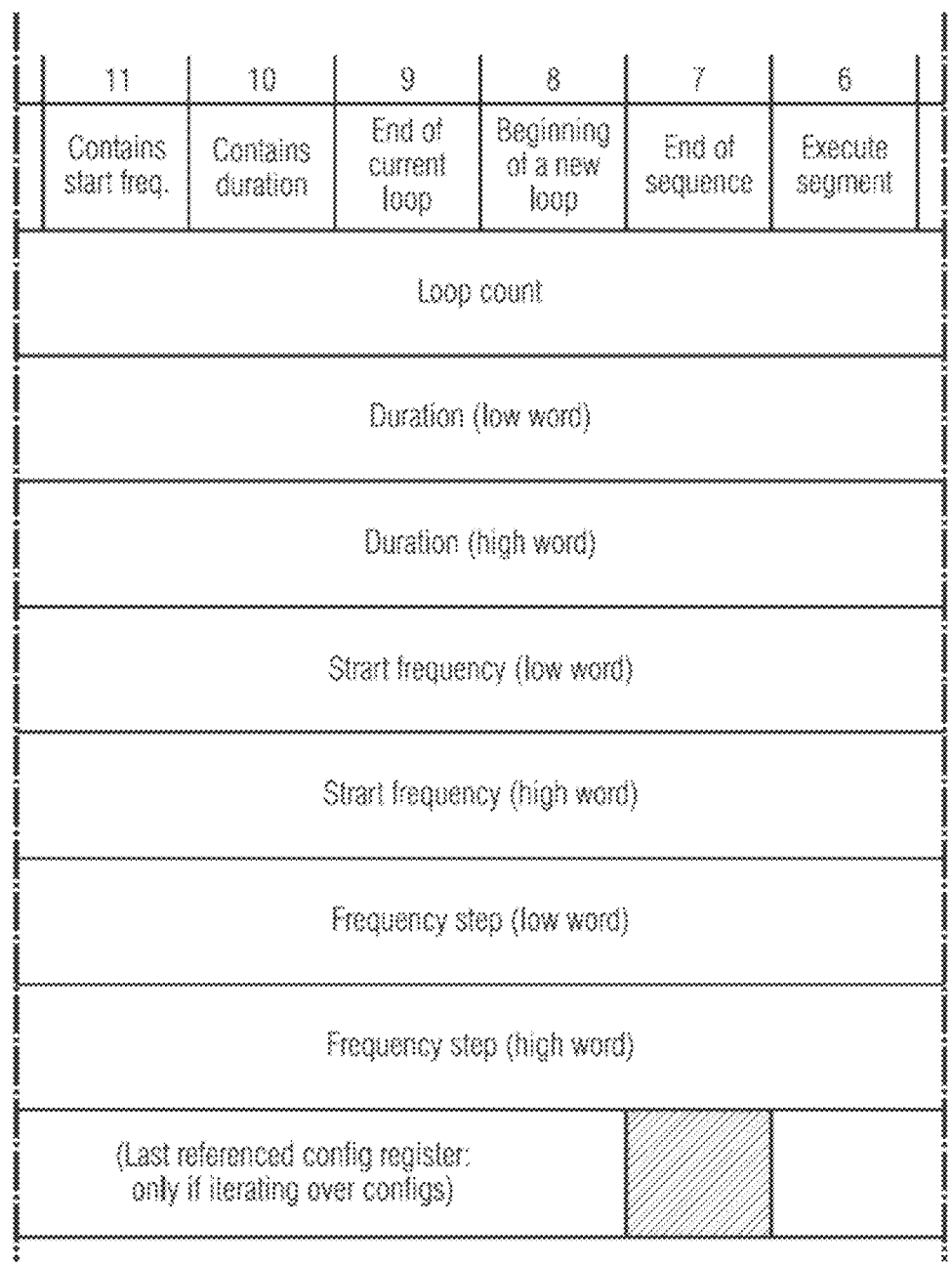
FIG. 2 shows one example implementation of a system comprising a plurality of semiconductor chips.
FIG. 9 (presented as a combination of FIG. 9-1, FIG. 9-2, and FIG. 9-3) shows one example implementation of an instruction.

FIG. 2 shows system 200 comprising a first semiconductor chip 210 in accordance with the principles described in association with FIG. 1 and also a second semiconductor chip 220-1 and optionally further second semiconductor chips 220-n. The first semiconductor chip 210 is embodied as a master, wherein the second semiconductor chip 220-1 and also the further second semiconductor chips 220-n are embodied as slaves.

The sequencing circuit 211 of the first semiconductor chip 210 is configured to generate a control signal for a sequencing circuit 221-1 of the second semiconductor chip 220-1 (and correspondingly optionally also for the sequencing circuits 221-n of the further second semiconductor chips 220-n). The control signal is output via the master/slave interface 212 of the first semiconductor chip 210 to the master/slave interface 222-1 of the second semiconductor chip 220-1. The control signal comprises at least one instruction for the sequencing circuit 221-1 of the second semiconductor chip 220-1 relative to a second sequencing scheme for time-dependent functions of at least one transmit channel (not shown) and/or of at least one receive channel (not shown) for radar signals of the second semiconductor chip 220-1. The sequencing circuit 211 of the first semiconductor chip can thus determine instructions for the second semiconductor chip 220-1 and forward them to the latter in order that the transmit channel and/or the receive channel of the second semiconductor chip 220-1 are/is correspondingly driven by the sequencing circuit 221-1 of the second semiconductor chip 220-1. In other words: the master/slave interface 212 of the first semiconductor chip 210 can transfer sequence instructions to the slave unit, such that the sequencing unit in the master chip can transfer instructions to the slave unit.

Alternatively, the sequencing circuit 211 of the first semiconductor chip 210 can also be configured to generate a trigger signal for the sequencing circuit 221-1 of the second semiconductor chip 220-1 (and correspondingly optionally also for the sequencing circuits 221-n of the further second semiconductor chips 220-n). The trigger signal causes the sequencing circuit 221-1 of the second semiconductor chip 220-1 to determine a sequencing scheme for time-dependent functions of at least the transmit channel and/or the receive channel of the second semiconductor chip 220-1 and to drive circuit elements of the transmit channel and/or of the receive channel of the second semiconductor chip 220-1 in accordance with the sequencing scheme. The sequencing circuit 211 of the first semiconductor chip can thus trigger the synchronization and/or sequencing functionality of the second semiconductor chip 220-1. In other words: the master/slave interface 212 of the first semiconductor chip 210 can transfer trigger signals to the slave unit in order to trigger a sequencing unit in the slave chip.

Figures 3, 9:
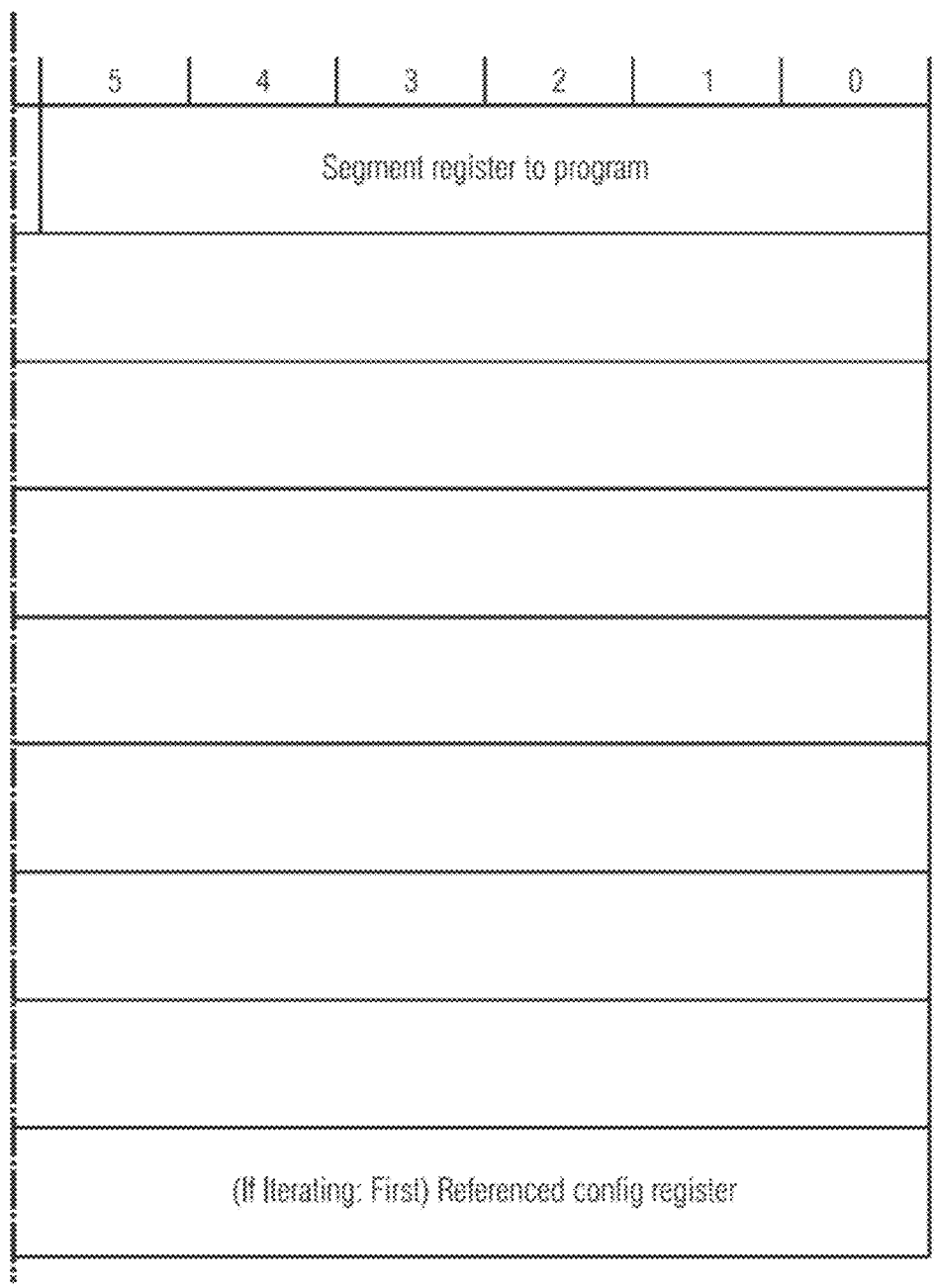
FIG. 3 shows a further example implementation of a system comprising a plurality of semiconductor chips.

FIG. 3 shows system 300 comprising a first semiconductor chip 310 in accordance with the principles described in association with FIG. 1 and also a second semiconductor chip 320-1 and optionally further second semiconductor chips 320-n. The first semiconductor chip 310 is embodied as master, wherein the second semiconductor chip 320-1 and also the further second semiconductor chips 320-n are embodied as slaves.

The second semiconductor chip 320-1 comprises a memory 311-1 and also at least one transmit channel (not shown) and/or at least one receive channel (not shown) for radar signals. A further sequencing scheme for time-dependent functions of the further transmit channel of the second semiconductor chip 320-1 and/or of the further receive channel of the second semiconductor chip 320-1 is stored in the memory 311-1. Accordingly, the further second semiconductor chips 320-n also each comprise a memory 311-n and at least one transmit channel (not shown) and/or at least one receive channel (not shown) for radar signals.

The control circuit 311 of the first semiconductor chip 310 is configured to generate a trigger signal that causes circuit elements of the further transmit channel and/or of the further receive channel of the second semiconductor chip 320-1 (and correspondingly optionally of the further second semiconductor chips 320-n) to perform the time-dependent functions in accordance with the further sequencing scheme stored in the memory 321-1 (and respectively the memories 321-n). In other words: only the master chip, but not the slave chips, uses a sequencing unit, wherein the sequencing unit can instruct the slave chips directly to apply the sequencing scheme stored in them.

Example driving of a transmit channel for a radar signal is described below with reference to FIGS. 4 to 10.

In this case, FIG. 4 shows a device 400 for driving at least one transmit channel 430 for a radar signal. Device 400 can be e.g. part of the sequencing circuit 130 shown in FIG. 1.

Device 400 comprises a plurality of registers 410-1, 410-2, 410-3, 410-4 . . . 410-n. Configuration parameters for circuit components of the transmit channel 430 and frequency parameters for a respective assigned signal section of the radar signal are stored in the plurality of registers 410-1, 410-2, 410-3, 410-4 . . . 410-n.

Figure 6:
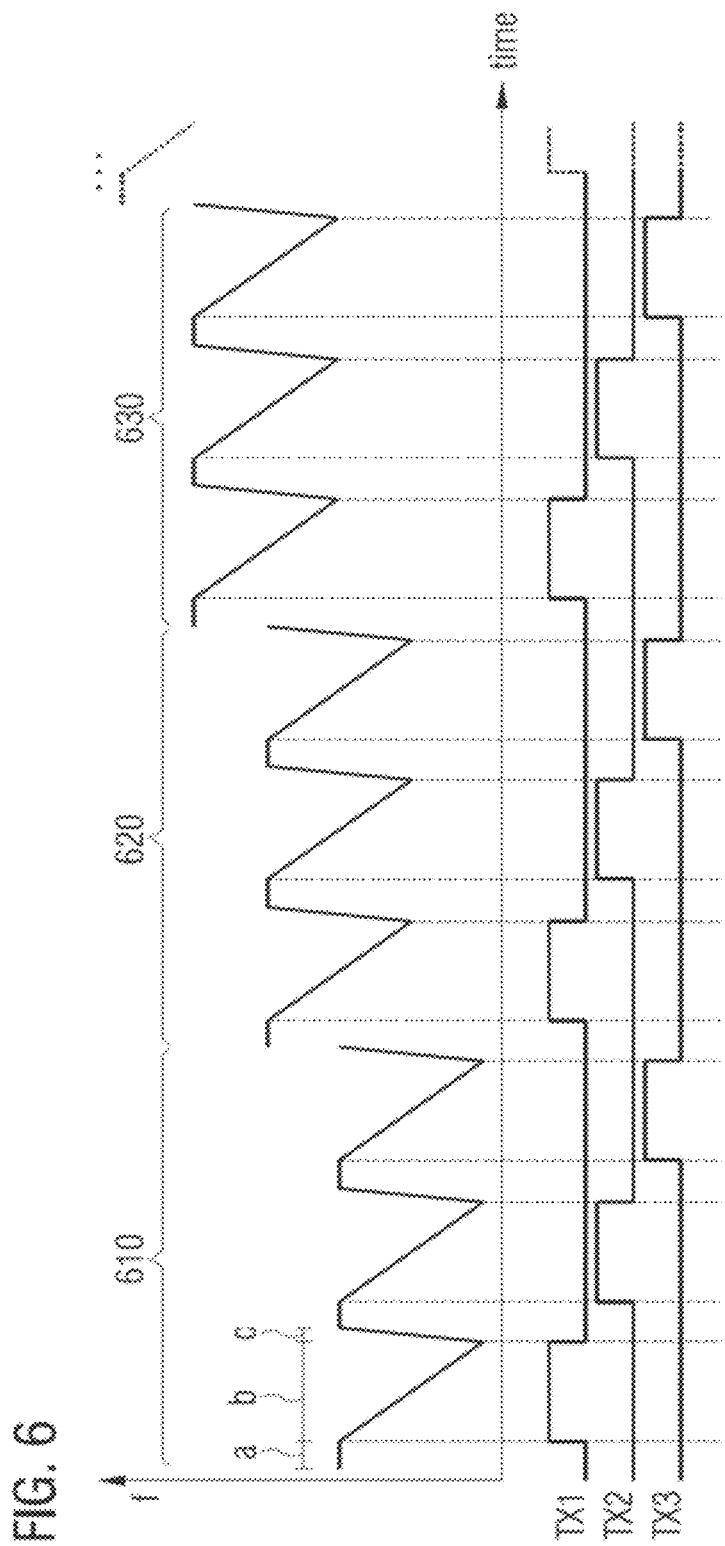
FIG. 6 shows one example implementation of a frequency ramp scenario.
Figure 7:
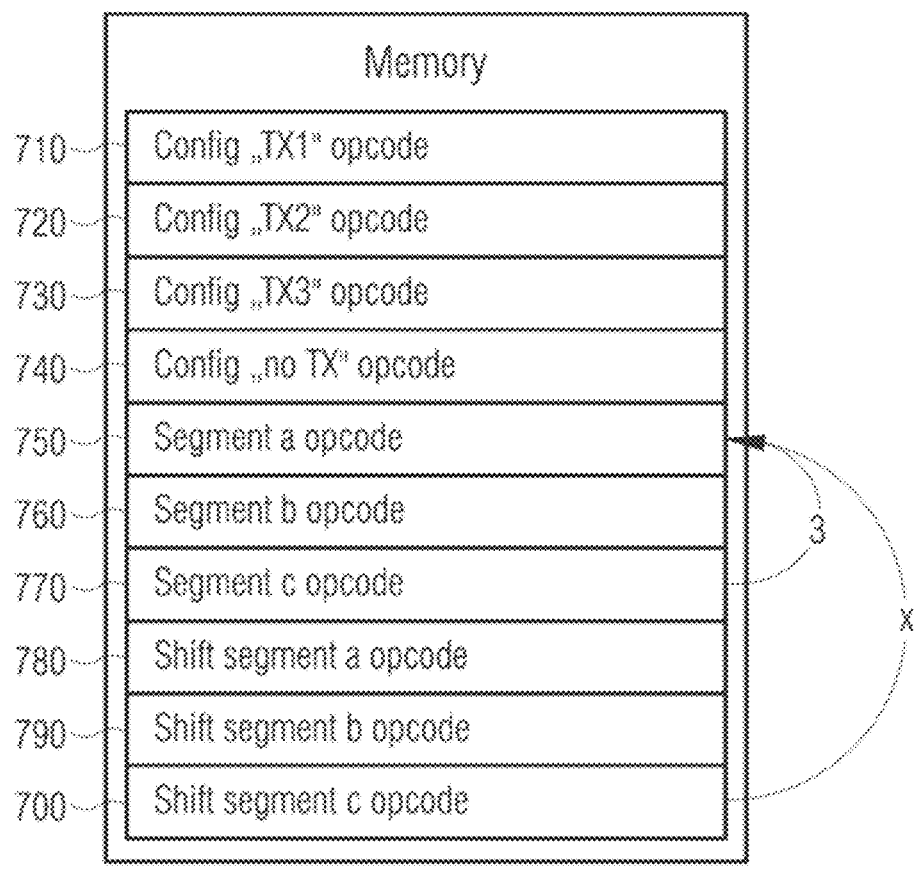
FIG. 7 shows one example implementation of a sequence of instructions.

The configuration parameters for the circuit components of the transmit channel 430 comprise specific configurations for one or more circuit components of the transmit channel (e.g. an ADC, a PA or a monitoring function). The radar signal includes a plurality of successive signal sections. The frequency parameters for the respective signal section indicate e.g. a start frequency, a stop frequency and/or a duration of the signal section. By way of example, a signal section can correspond to a ramp segment of a frequency ramp of the radar signal (as shown in FIG. 6).

Furthermore, device 400 comprises a control circuit 420 configured to read the plurality of registers sequentially 410-1, 410-2, 410-3, 410-4 . . . 410-n and to drive the circuit components of the transmit channel 430 in each case on the basis of the information items stored in the plurality of registers.

In this way, the radar signal can be generated segment by segment on the basis of the sequentially read plurality of registers sequentially 410-1, 410-2, 410-3, 410-4 . . . 410-n.

For a single signal section of the radar signal, the configuration parameters for the circuit components of the transmit channel 430 and the frequency parameters for the assigned signal section can be stored either jointly in a single register or in separate registers.

By way of example, the plurality of registers 410-1, 410-2, 410-3, 410-4 . . . 410-n can comprise a first register set having a plurality of first registers and a second register set having a plurality of second registers. In this case, the configuration parameters are stored in the plurality of first registers, wherein the frequency parameters together with at least one reference to one of the first registers are stored in the plurality of second registers. In other words: instead of jointly storing the configuration parameters and the frequency parameters of a signal section of the radar signal (e.g. of a ramp segment), they can also be stored in separate registers.

Figure 5:
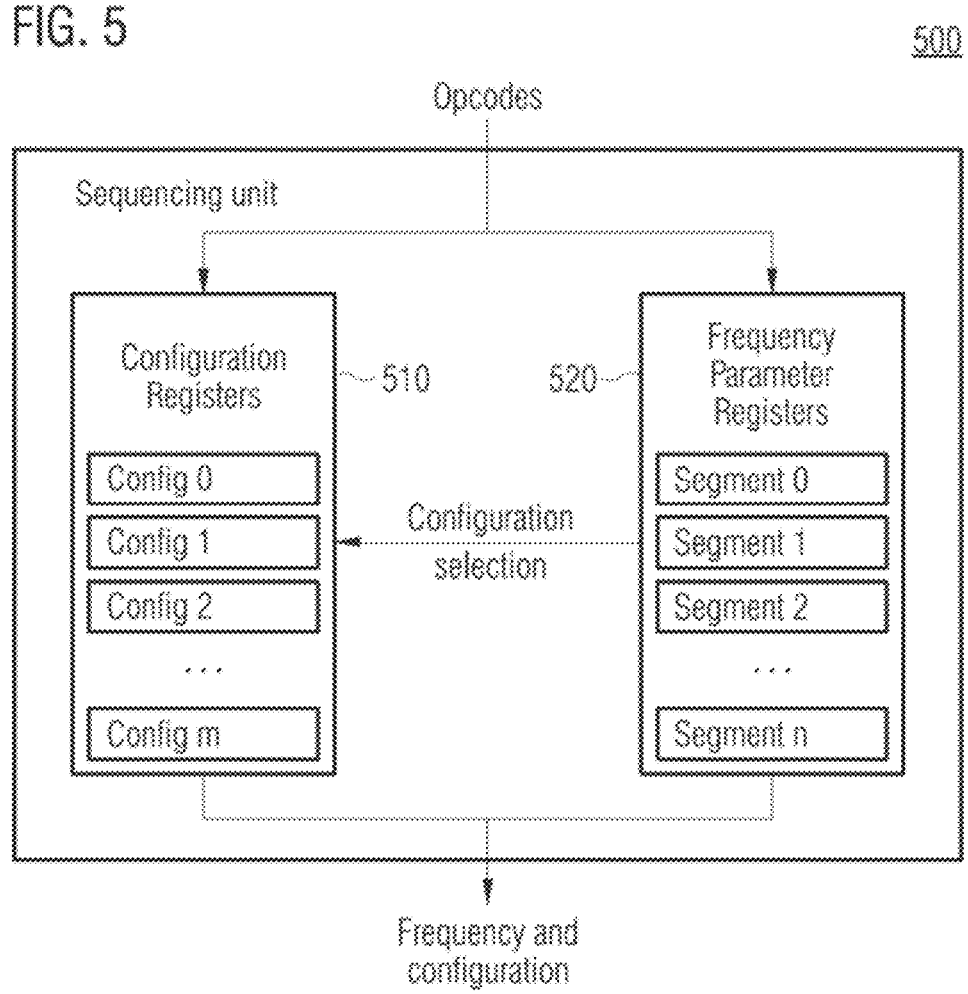
FIG. 5 shows a further example implementation of a device for driving at least one transmit channel for a radar signal.

This is shown in FIG. 5. Device 500 comprises the first register set 510 having the plurality of first registers, in which the configuration parameters are stored, and the second register set 520 having the plurality of second registers, in which the frequency parameters for a respective associated signal section together with at least one reference to one of the first registers are stored.

The first registers contain configuration parameters for (all) internal and external circuits or modules of the transmit channel which have to be controlled synchronously for the generation of the respective signal section of the radar signal (e.g. for generating a frequency ramp).

Not only a start and stop frequency of a signal section (e.g. ramp segment) and the duration thereof, but also the reference to one or more first registers are stored in the second registers. This can make it possible that a specific configuration (in the form of the configuration parameters) can be programmed and stored only a single time, since reference can be made to this setting by way of the reference stored in the respective second register by virtue of a multiplicity of second registers. For various/different signal sections, reference can thus be made to the configuration stored in said one first register. The configuration does not have to be stored separately or anew for each signal section. Splitting the registers into the two register sets thus makes it possible to reuse configuration data programmed previously. The memory demand for generating the individual signal sections of the radar signal can thus be reduced by the splitting.

Furthermore, a first loop information item indicating a beginning of a loop and a (finite or infinite) number of loop iterations can be stored in a first register of the plurality of registers (e.g. a first of the plurality of second registers 520) and a second loop information item indicating an end of the loop can be stored in a second register of the plurality of registers (e.g. a second of the plurality of second registers 520). The control circuit 420 is then correspondingly furthermore configured to read the registers starting from the first of the plurality of registers up to the second of the plurality of registers in order to generate a loop body and to drive the circuit components of the transmit channel 430 repeatedly in accordance with the number of loop iterations on the basis of the loop body. This can enable a significant additional reduction of the memory demand. This is explained in greater detail below with reference to the frequency ramp scenario shown in FIG. 6.

The frequency ramp scenario shown in FIG. 6 shows the temporal frequency profile of a radar signal and includes a plurality of ramp sequences 610, 620, 630, . . . , which are identical with regard to their profile but frequency-shifted with respect to one another. Each of the ramp sequences 610, 620, 630, . . . includes a plurality of frequency ramps each consisting of a ramp segment a, a ramp segment b and a ramp segment c. Each of the ramp segments a, b and c is determined by its start frequency, its stop frequency and its duration. The three b ramp segments in each ramp sequence can be generated e.g. using three transmit channels. Although just under thirty ramp segments are defined, four configurations can suffice to generate the radar signal. A respective configuration is used for each of the three activated transmit channels, and also an additional configuration in which all the transmit channels are deactivated. The amount of memory required for programming or storing the ramp scenario can thus be significantly reduced by the splitting of the registers.

By means of a memory circuit (not shown in FIG. 4), on the basis of a received instruction, it is possible to update at least one configuration parameter in one or more of the plurality of registers 410-1, 410-2, 410-3, 410-4 . . . 410-$n$ and/or to update at least one frequency parameter in one or more of the plurality of registers 410-1, 410-2, 410-3, 410-4 . . . 410-$n$ and/or to update at least one loop information item in one or more of the plurality of registers 410-1, 410-2, 410-3, 410-4 . . . 410-$n$.

Likewise, a received instruction can comprise execution information items indicating whether one of the plurality of registers is intended to be executed. Accordingly, the control circuit 420 can furthermore be configured, depending on the execution information items, to drive the circuit components of the transmit channel 430 on the basis of the information items stored in said one of the plurality of registers 410-1, 410-2, 410-3, 410-4 . . . 410-$n$.

The instructions can be embodied as opcodes e.g. in a microprocessor-like or -similar approach.

The programming of the ramp scenario illustrated in FIG. 6 can be carried out here with just ten instructions (e.g. opcodes). This is illustrated by way of example in FIG. 7.

By means of the first four instructions 710, 720, 730 and 740, the four configurations for the frequency segments a, b, c of each ramp sequence in the form of the configuration parameters are programmed or stored in the plurality of registers (e.g. in four registers of the plurality of first registers 510). A respective configuration is stored for each of the three activated transmit channels in one of the registers, and also an additional configuration in which all the transmit channels are deactivated.

The ramp segments a, b and c are manifested three times in each ramp sequence, wherein the ramp segments a and c refer to the register having the configuration in which all the transmit channels are deactivated, while the segment b iterates over registers having the configurations for the three transmit channels. That is to say that three instructions 750, 760 and 770 are used, which additionally program or store the loop information items in three (of the plurality of second) registers in each case besides the initial frequency parameters for the ramp segments a, b and c of the first ramp sequence and also the references to the associated registers (from among the plurality of first registers). The first ramp sequence 610 can be executed in this way.

Afterward, another three instructions 780, 790 and 700 are used to shift the frequency parameters (e.g. the start frequencies) in the three (of the plurality of second) registers for the transition from one ramp sequence to the next (e.g. from the first ramp sequence 610 to the second ramp sequence 620). The respective registers need not be executed or are not executed—just the register value is updated.

Once all the register values have been updated, the outer loop jumps back, and the second ramp sequence 620 is generated on the basis of the registers updated in accordance with the instructions 780, 790 and 700.

The entire loop is repeated until the predetermined number of loop iterations has been reached.

As indicated above, a plurality of references to different registers from among the plurality of first registers 510 can be stored at least in one of the second registers 520. Accordingly, the control circuit 420 can then furthermore be configured, in the case of multiple driving of the circuit components of the transmit channel 430, on the basis of said one second register, to use respectively a different one of the plurality of references to the different first registers for the driving of the circuit components of the transmit channel 430. Relative to the above example in FIG. 6, upon each execution of the second register assigned to the ramp segment b, a different one of the references to the three first registers in which the configuration parameters for one of the three transmit channels are respectively stored is used for the generation of the radar signal. That is to say that the second registers 520 can be designed not only to refer to an individual one of the first registers 510, but to iterate over a range of same. This allows the configuration to be switched if one of the second registers 520 is reused, without requiring a separate instruction (e.g. opcode) for this purpose.

Figure 8:
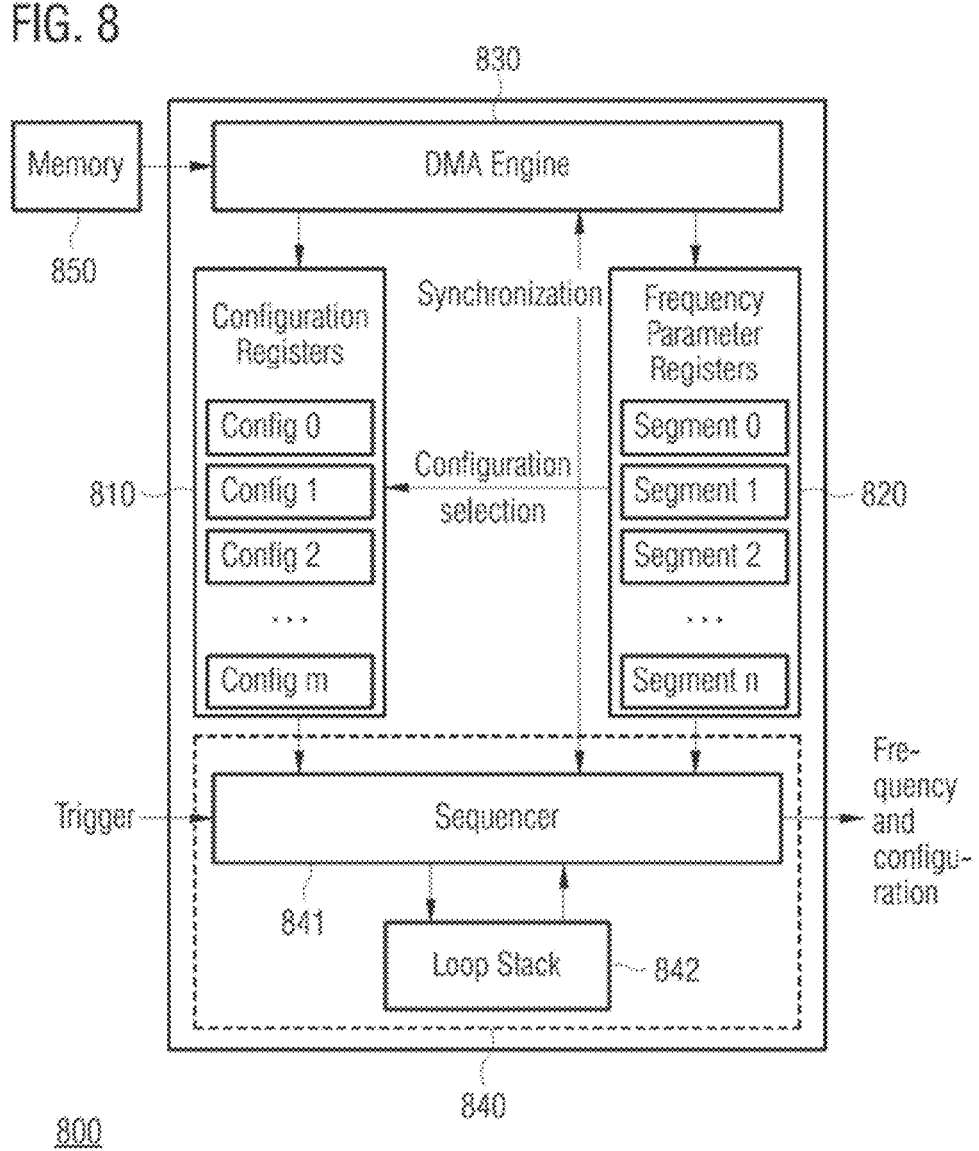
FIG. 8 shows a further example implementation of a device for driving at least one transmit channel for a radar signal.

FIG. 8 shows with a greater degree of detail a device 800 for driving at least one transmit channel for a radar signal. Device 800 comprises a plurality of registers, wherein configuration parameters for circuit components of the transmit channel and frequency parameters for a respective assigned signal section of the radar signal are stored in the plurality of registers. The plurality of registers comprises a first register set 810 having a plurality of first registers and a second register set 820 having a plurality of second registers. The configuration parameters are stored in the plurality of first registers 810. The frequency parameters are stored together with at least one reference to one of the first registers in the plurality of second registers 820.

A control circuit 840 of the device 800 is configured to read the plurality of second registers 820 sequentially and, by means of the sequencing circuit 841, to drive the circuit components of the transmit channel in each case on the basis of the information items stored in the plurality of second registers 820.

Furthermore, device 800 comprises a memory circuit 830 configured, on the basis of a received instruction, to update at least one configuration parameter in one or more of the plurality of (first) registers and/or to update at least one frequency parameter in one or more of the plurality of (second) registers. The memory circuit can be designed e.g. as a Direct Memory Access (DMA) engine that accesses an internal memory 850 of the transmit channel or of the radar system and reads the instructions (e.g. opcodes) from the latter in order to program or store the configuration and frequency parameters correspondingly in the plurality of registers. As indicated above, the instruction can comprise update information for one or more of the plurality of registers.

By way of example, the received instruction can comprise items of information about an updated absolute value of the configuration parameter in said one of the plurality of (e.g.

first) registers and/or items of information about an updated absolute value of the frequency parameter in said one of the plurality of (e.g. second) registers. Accordingly, the memory circuit 830 can be configured to overwrite an instantaneous value of the configuration parameter with the updated absolute value of the configuration parameter and/or to overwrite an instantaneous value of the frequency parameter with the updated absolute value of the frequency parameter. Likewise, the instruction can comprise updated loop information items indicating a beginning of a loop, an end of a loop and/or a number of loop iterations. Accordingly, the memory circuit 830 can be configured to overwrite instantaneous loop information items with the updated loop information items.

Alternatively, the received instruction can also comprise items of information about a change in an instantaneous value of the frequency parameter in said one of the plurality of registers. Memory circuit 830 can then be configured to change the instantaneous value of the frequency parameter in accordance with the items of information about the change in the instantaneous value of the frequency parameter.

In other words: registers can be updated on the basis both of absolute and of relative update information.

One example of an instruction 900 for updating one or more of the second registers 820 is shown in the form of an opcode in FIG. 9. FIG. 9 is shown as a combination of three figures: FIG. 9-1, FIG. 9-2, and FIG. 9-3. FIG. 9-1 is the left-most figure of FIG. 9. FIG. 9-2 is the middle figure of FIG. 9. FIG. 9-3 is the right-most figure of FIG. 9.

As shown in FIG. 9, the instruction 900 comprises at least one header 910, in which individual bits indicate what information is contained in the instruction. As indicated in FIG. 9, the header 910 can indicate, for example, which or which of the plurality of second registers 820 ought to be programmed, whether loop information items ought to be stored in a register or which frequency parameters (e.g. start frequency, stop frequency, duration) ought to be updated. Depending on the bits set in the header 910, the instruction 900 contains additional structures (words). Parts of the instruction (e.g. opcode) which are used for programming the registers can thus be omitted in order selectively to update only parts of the registers.

As indicated in FIG. 9, the instruction 900 can have e.g. in each case additional structures for the number of loop executions, the duration of the signal section assigned to the register, the start frequency, the frequency step and/or the reference to one or more of the first registers 810. The fields for the duration, the start frequency and the stop frequency can contain e.g. a bit for indicating whether the new value should be added to the value currently stored in the segment register (i.e. relative change) or whether the latter ought to be overwritten (i.e. absolute change). The configuration reference field contains a bit for indicating whether it contains a single, fixed reference to one of the first registers 810, or a range of first registers 810 over which the ramp segment ought to iterate in different executions. It is thus possible to omit parts of the instruction for programming a register if only parts thereof ought to be updated. Furthermore, the instruction can specify whether each part of the register ought to be set to an absolute value or whether a value ought to be modified relative to the value stored previously.

The header 910 additionally contains the bit "Execute segment" for selecting whether the updated segment ought to be executed by the control circuit 840 or whether the instruction ought only to modify the register. Furthermore, the header 910 also contains the bit "End of sequence" for indicating that the ramp sequence is ended after this segment.

In other words: a received instruction can furthermore comprise execution information items indicating whether one of the plurality of (second) registers is intended to be executed. The control circuit 840 is then configured, depending on the execution information items, to drive the circuit components of the transmit channel on the basis of the information items stored in said one of the plurality of (second) registers. Likewise, a received instruction can comprise termination information for one of the plurality of (second) registers. The control circuit 840 is then configured, on the basis of the termination information, to drive the circuit components of the transmit channel to end the generation of the radar signal after the signal section assigned to said one of the plurality of (second) registers.

Using the loop bits in header 910, loops can furthermore be defined—without any additional instructions. In the control circuit 840, using a stack data structure, it is possible to store start address or start register and count of the loop in a separate, internal loop stack 842. By way of example, if a segment or associated second register with the bit "Beginning of a new loop" is executed, its address and its loop count are pushed onto said loop stack 842. After the execution of a segment or of the associated second register with the bit "End of current loop" (possibly the same as at the beginning of the loop), the topmost loop count of the loop stack 842 is decremented and, if the loop is not ended, the start of the loop is loaded as the next instruction (e.g. opcode).

In other words: a first loop information item indicating a beginning of a loop and a number of loop iterations is stored in a first register of the plurality of second registers 820, and a second loop information item indicating an end of the loop is stored in a second register of the plurality of second registers 820. The control circuit 840 is configured to read the second registers starting from the first of the plurality of second registers 820 up to the second of the plurality of second registers 820 in order to generate a loop body and to drive the circuit components of the transmit channel repeatedly in accordance with the number of loop iterations on the basis of the loop body.

Figure 10:
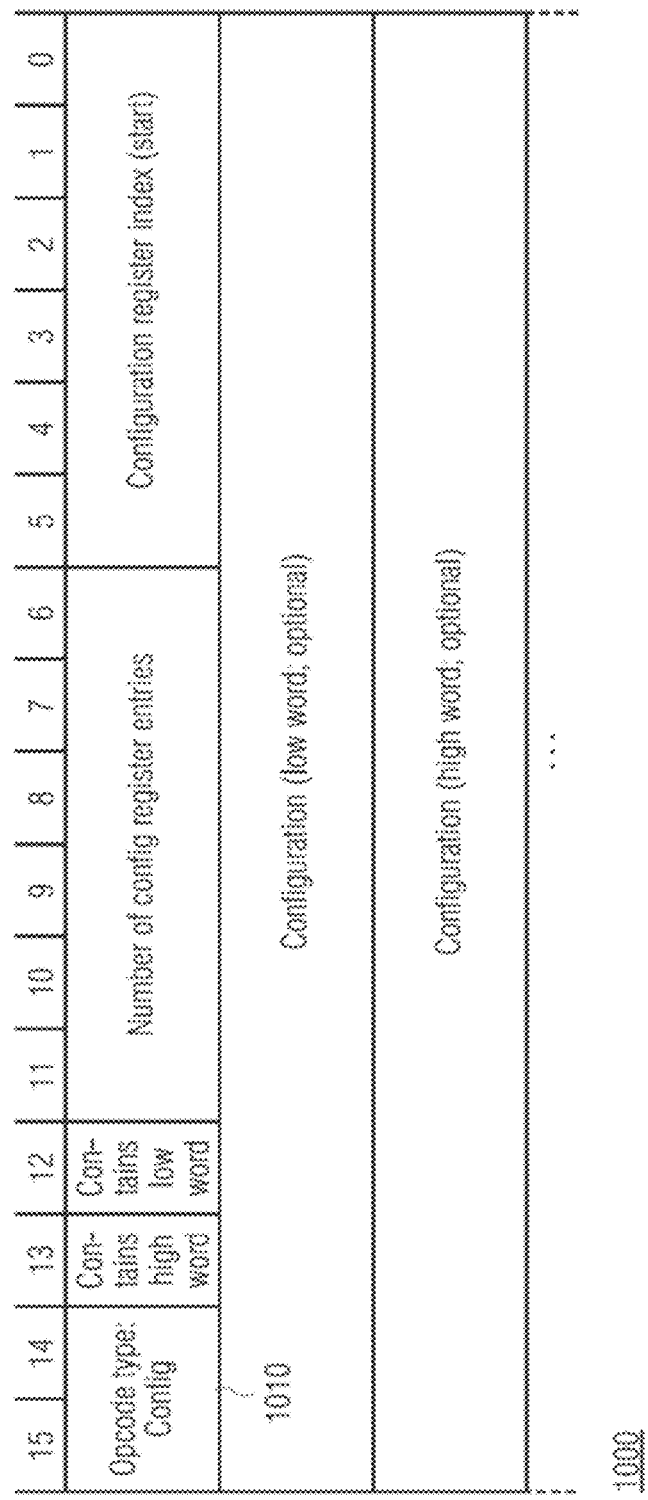
FIG. 10 shows a further example implementation of an instruction.

One example of an instruction 1000 for updating one or more of the first registers 810 is shown in the form of a further opcode in FIG. 10. The instruction 1000 once again comprises a header 910, in which individual bits indicate at which register of the plurality of first registers 810 the update ought to be begun and the number of registers to be updated. For each register to be changed, a high word and/or a low word with the new configuration for the register are/is additionally contained.

The control circuit 840 can begin the driving of the transmit channel for generating the ramp sequence e.g. on account of an external trigger.

While a segment or the associated register(s) is/are executed, all other registers not currently being used can be reprogrammed by further instructions (e.g. opcodes). By way of example, it is possible to copy the information items from the associated registers into the loop stack 842 in order to be executed or processed by the control circuit 840. Even while the register information items stored in the loop stack 842 are being processed, the first registers 810 and/or the second registers 820 can be updated. Referring to the example shown in FIG. 7, the frequency shift instructions 780, 790 and 700 for the ramp segments a, b and c can already be executed while the segment c is still being processed by the control circuit. In this regard, the updated segment a can be executed directly after segment c has ended.

The memory circuit 830 is synchronized with the control circuit 840 for this purpose, such that registers currently being used (e.g. read or copied into the loop stack 842) by the control circuit 840 are not overwritten. By way of example, the memory circuit 830 can be stopped until the control circuit 840 has finished reading or executing the registers currently being used, in order subsequently to update them. If the register to be updated is for example a register which is still to be executed and which has not yet been used or processed by the control circuit (e.g. because the control circuit 840 is still busy processing information for previous ramp segments), in accordance with example implementations, the memory circuit 830 can be stopped until the register has been used by the control circuit 840. This can allow e.g. new parameters to be loaded while others are being executed. This can make it possible to execute ramp sequences which as a whole are too large to fit into the plurality of registers.

In other words: the memory circuit 830 can furthermore be configured to update one of the plurality of registers only if said one of the plurality of registers is not being instantaneously accessed by the control circuit 840. Furthermore, the memory circuit is then configured to update said one of the plurality of registers as soon as the control circuit 840 is no longer accessing said one register.

Figure 11:
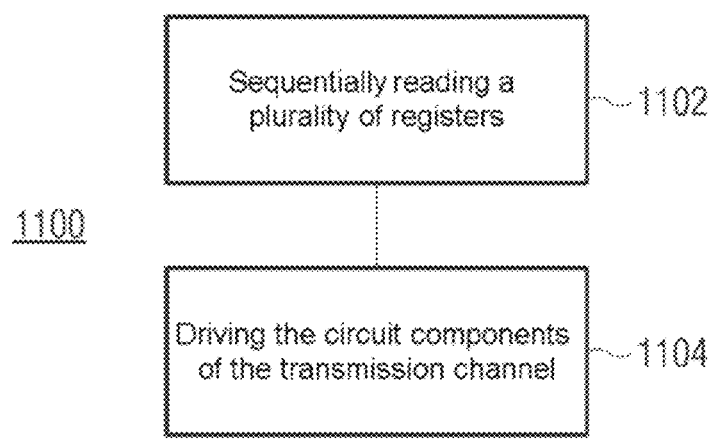
FIG. 11 shows a flow diagram of one example implementation of a method for driving at least one transmit channel for a radar signal.

In order to summarize the above-described aspects for synchronizing functions in radar sensors or radar systems, FIG. 11 shows a flow diagram of a method 1100 for driving at least one transmit channel for a radar signal. Method 1100 comprises sequentially reading 1102 a plurality of registers, wherein configuration parameters for circuit components of the transmit channel and frequency parameters for a respective assigned signal section of the radar signal are stored in the plurality of registers. Furthermore, method 1100 comprises driving 1104 the circuit components of the transmit channel in each case on the basis of the information items stored in the plurality of registers.

Further details and aspects of the method have been described above in association with further example implementations (e.g. FIGS. 4 to 10). The method can comprise one or more optional features in accordance with the further example implementations.

At the system level, a central sequencing or function synchronization in accordance with the present concept eases the demand for a time-critical interaction between e.g. a master microcontroller and the radar chip. By additionally reducing the memory demand required for a ramp sequence, it is possible further to minimize the processing load for the master microcontroller.

The aspects and features that have been described together with one or more of the examples and figures described in detail above can also be combined with one or more of the other examples in order to replace an identical feature of the other example or in order additionally to introduce the feature into the other example.

Examples can furthermore be or be related to a computer program comprising a program code for carrying out one or more of the above methods when the computer program is executed on a computer or processor. Steps, operations or processes of various methods described above can be performed by programmed computers or processors. Examples can also cover program storage devices, e.g. digital data storage media, which are machine-, processor- or computer-readable and code machine-executable, processor-executable or computer-executable programs of instructions. The instructions carry out some or all of the steps of the methods described above or cause them to be carried out. The program storage devices can comprise or be e.g. digital memories, magnetic storage media such as, for example, magnetic disks and magnetic tapes, hard disk drives or optically readable digital data storage media. Further examples can also cover computers, processors or control units which are programmed to carry out the steps of the methods described above, or (field) programmable logic arrays ((F)PLAs) or (field) programmable gate arrays ((F)PGAs) which are programmed to carry out the steps of the methods described above.

The description and drawings present only the principles of the disclosure. Furthermore, all examples mentioned here are intended to be used expressly only for teaching purposes, in principle, in order to assist the reader in understanding the principles of the disclosure and the concepts contributed by the inventor(s) for further development of the art. All statements herein regarding principles, aspects and examples of the disclosure and also concrete examples thereof are intended to encompass the counterparts thereof.

A functions block designated as "means for . . . " carrying out a specific function can relate to a circuit or software configured for carrying out a specific function. Consequently, a "means for something" can be implemented as a "means configured for or suitable for something", e.g. a component, a circuit or software configured for or suitable for the respective task.

Functions of different elements shown in the figures including those function blocks designated as "means", "means for providing a signal", "means for generating a signal", etc. can be implemented in the form of dedicated hardware, e.g. "a signal provider", "a signal processing unit", "a processor", "a controller", etc., and as hardware capable of executing software in conjunction with associated software. When provided by a processor, the functions can be provided by a single dedicated processor, by a single jointly used processor or by a plurality of individual processors, some or all of which can be used jointly. However, the term "processor" or "controller" is far from being limited to hardware capable exclusively of executing software, but rather can encompass digital signal processor hardware (DSP hardware), application specific integrated circuits (ASICs), field programmable logic arrays (FPGAs), read only memory (ROM) for storing software, random access memory (RAM) and non-volatile memory devices (storage). Other hardware, conventional and/or customized, can also be included.

A block diagram can illustrate for example a rough circuit diagram which implements the principles of the disclosure. In a similar manner, a flow diagram, a flow chart, a state transition diagram, a pseudo-code and the like can represent various processes, operations or steps which are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of a plurality of steps, processes, operations or functions disclosed in the description or the claims should not be interpreted as being in the specific order, unless this is explicitly or implicitly indicated otherwise, e.g. for technical reasons. The disclosure of a plurality of steps or functions therefore does not limit them to a specific order unless said steps or functions are not interchangeable for technical reasons. Furthermore, in some examples, an individual step, function, process or operation can include a plurality of partial steps, functions, processes or operations and/or be subdivided into them. Such partial steps can be included and be part of the disclosure of said individual step, provided that they are not explicitly excluded.

Furthermore, the claims that follow are hereby incorporated in the detailed description, where each claim can be representative of a separate example by itself. While each claim can be representative of a separate example by itself, it should be taken into consideration that—although a dependent claim can refer in the claims to a specific combination with one or more other claims—other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

The invention claimed is:

1. A semiconductor chip, comprising:
a transmit channel for processing a radar signal, wherein the transmit channel comprises circuit elements; and
a sequencing circuit comprising a plurality of registers, storing information items, including one or more first registers, storing one or more configuration parameters for circuit components of the transmit channel, and one or more second registers storing frequency parameters for a signal section, associated with a respective register of each of the plurality of registers, and a reference to a first register of the plurality of first registers,
wherein the sequencing circuit is configured to:
determine a sequencing scheme for one or more time-dependent functions of the transmit channel, and
drive the circuit elements in accordance with the sequencing scheme and based on the information items stored in the plurality of registers.

2. The semiconductor chip of claim 1, wherein the one or more time-dependent functions comprise at least one of:
a signal generating function, of the transmit channel, relating to generating a radio-frequency radar transmission signal,
a signal processing function, of a receive channel for processing the radar signal, relating to processing a radio-frequency radar reception signal,
a first monitoring function, for one or more circuit components of at least one of the transmit channel or the receive channel, or
a second monitoring function for a signal processed by the at least one of the transmit channel or the receive channel.

3. The semiconductor chip of claim 1, wherein at least one of the transmit channel or a receive channel, for processing the radar signal, is part of a modulated continuous wave radar system.

4. The semiconductor chip of claim 1, wherein the sequencing circuit comprises an instruction-processing unit with an instruction set for determining the sequencing scheme.

5. The semiconductor chip of claim 4, wherein the instruction set comprises:
first instructions for a configuration of the circuit elements, and
second instructions for a configuration of frequency parameters of a radio-frequency radar transmission signal generated by the transmit channel.

6. A system, comprising:
a first semiconductor chip comprising:
a transmit channel for processing a radar signal, wherein the transmit channel comprises circuit elements; and
a sequencing circuit comprising a plurality of registers, storing information items, including one or more first registers, storing one or more configuration parameters for circuit components of the transmit channel, and one or more second registers storing frequency parameters for a signal section, associated with a respective register of each of the plurality of registers, and a reference to a first register of the plurality of first registers,
wherein the sequencing circuit is configured to:
determine a sequencing scheme for one or more first time-dependent functions of the transmit channel, and
drive the circuit elements in accordance with the sequencing scheme and based on the information items stored in the plurality of registers; and
a second semiconductor chip comprising:
at least one of a second transmit channel or a receive channel, and
a second sequencing circuit configured to receive a control signal, generated by the sequencing circuit, comprising an instruction for one or more second time-dependent functions of the at least one of the second transmit channel or the receive channel.

7. A system, comprising:
a first semiconductor chip comprising;
a transmit channel for processing a radar signal, wherein the transmit channel comprises circuit elements; and
a sequencing circuit comprising a plurality of registers, storing information items, including one or more first registers, storing one or more configuration parameters for circuit components of the transmit channel, and one or more second registers storing frequency parameters for a signal section, associated with a respective register of each of the plurality of registers, and a reference to a first register of the plurality of first registers,
wherein the sequencing circuit is configured to:
determine a sequencing scheme for one or more first time-dependent functions of the transmit channel,
drive the circuit elements in accordance with the sequencing scheme and based on the information items stored in the plurality of registers, and
generate a triggering signal; and
a second semiconductor chip comprising:
at least one of a second transmit channel or a receive channel comprising second circuit elements, and
a second sequencing circuit configured to:
determine a second sequencing scheme, for one or more second time-dependent functions of the at least one of the second transmit channel or the receive channel, and
drive the second circuit elements in accordance with the second sequencing scheme when receiving the triggering signal.

8. A system, comprising:
a first semiconductor chip comprising:
a transmit channel for processing a radar signal, wherein the transmit channel comprises circuit elements, and
a sequencing circuit storing a plurality of registers, storing information items, including one or more first registers, storing one or more configuration parameters for circuit components of the transmit channel, and one or more second registers storing frequency parameters for a signal section, associated with a respective register of each of the plurality of registers, and a reference to a first register of the plurality of first registers,
wherein the sequencing circuit is configured to:
determine a sequencing scheme for one or more first time-dependent functions of the transmit channel, and
drive the circuit elements in accordance with the sequencing scheme and based on the information items stored in the plurality of registers, and
a control circuit configured to generate a trigger signal; and
a second semiconductor chip comprising:
at least one of a second transmit channel, or a receive channel, for processing the radar signal,
wherein the at least one of the second transmit channel or the receive channel comprises second circuit elements, and
a memory storing a second sequencing scheme for one or more second time-dependent functions of the at least one of the second transmit channel or the receive channel,
wherein the second circuit elements are configured to perform the one or more second time-dependent functions in accordance with the second sequencing scheme.

9. A device for driving at least one transmit channel for a radar signal including a plurality of successive signal sections, comprising:
a plurality of registers storing information items, wherein each of the plurality of registers are assigned a respective signal section of the plurality of successive signal sections, and wherein the plurality of registers comprises a plurality of first registers, storing configuration parameters for circuit components of the at least one transmit channel, and a plurality of second registers storing frequency parameters for the respective signal section and a reference to a first register of the plurality of first registers; and
a control circuit configured to read the plurality of registers sequentially and drive the circuit components of the transmit channel based on the information items stored in the plurality of registers.

10. The device of claim 9, wherein the information items include:
a first loop information item, indicating a beginning of a loop and a number of loop iterations, stored in the first register of the plurality of registers, and
a second loop information item, indicating an end of the loop, stored in a second register of the plurality of registers,
wherein the control circuit is further configured to read the plurality of registers, starting from the first register, of the plurality of registers, up to the second register, of the plurality of registers, in order to generate a loop body, and drive the circuit components of the transmit channel repeatedly in accordance with a number of loop iterations and the loop body.

11. The device of claim 9, further comprising:
a memory circuit configured, based on a received instruction, to perform at least one of:
update at least one configuration parameter associated with the first register of the plurality of registers, or
update at least one frequency parameter associated with the first register of the plurality of registers.

12. The device of claim 11, wherein the received instruction comprises:
first items of information about a first updated absolute value of the at least one configuration parameter, or
second items of information about a second updated absolute value of the at least one frequency parameter, and
wherein the memory circuit is further configured to:
overwrite a first instantaneous value of the at least one configuration parameter with the first updated absolute value of the at least one configuration parameter, or
overwrite a second instantaneous value of the at least one frequency parameter with the second updated absolute value of the at least one frequency parameter.

13. The device of claim 11, wherein the received instruction comprises items of information about a change in an instantaneous value of a frequency parameter of the at least one frequency parameter, and wherein the memory circuit is further configured to change the instantaneous value of the at least one frequency parameter in accordance with the items of information about the change in the instantaneous value of the at least one frequency parameter.

14. The device of claim 11, wherein the memory circuit is further configured to update the first register when the control circuit is no longer accessing the first register.

15. The device of claim 11, wherein the memory circuit is further configured to update the first register only if the first register is not being instantaneously accessed by the control circuit when control circuit is reading the plurality of registers sequentially.

16. The device of claim 9, wherein a received instruction comprises execution information items indicating whether one of the plurality of registers is intended to be executed, and wherein the control circuit is further configured, based on the execution information items, to drive the circuit components of the transmit channel.

17. The device of claim 9, wherein a received instruction comprises termination information for one of the plurality of registers, and wherein the control circuit is further configured, based on the termination information, to drive the circuit components of the transmit channel to end generation of the radar signal after the respective signal section assigned to the one of the plurality of registers.

18. The device of claim 9, wherein a plurality of references to different registers of the plurality of registers are stored at least in one of the plurality of second registers, and wherein the control circuit is further configured to drive the circuit components of the transmit channel, based on one of the plurality of second registers, to use respectively a different one of the plurality of references to the different registers to drive the circuit components of the transmit channel.

19. A method for driving at least one transmit channel for a radar signal including a plurality of successive signal sections, comprising:
- sequentially reading a plurality of registers storing information items,
  - wherein each of the plurality of registers are assigned a respective signal section of the plurality of successive signal sections, and
  - wherein the plurality of registers comprises a plurality of first registers, storing configuration parameters for circuit components of the at least one transmit channel, and a plurality of second registers storing frequency parameters for the respective signal section and a reference to a first register of the plurality of first registers; and
- driving the circuit components of the transmit channel based on the information items stored in the plurality of registers.

20. The method of claim 19, wherein a plurality of references, including the reference, to different registers of the plurality of registers are stored at least in one of the plurality of second registers.

* * * * *